Patented Aug. 11, 1931

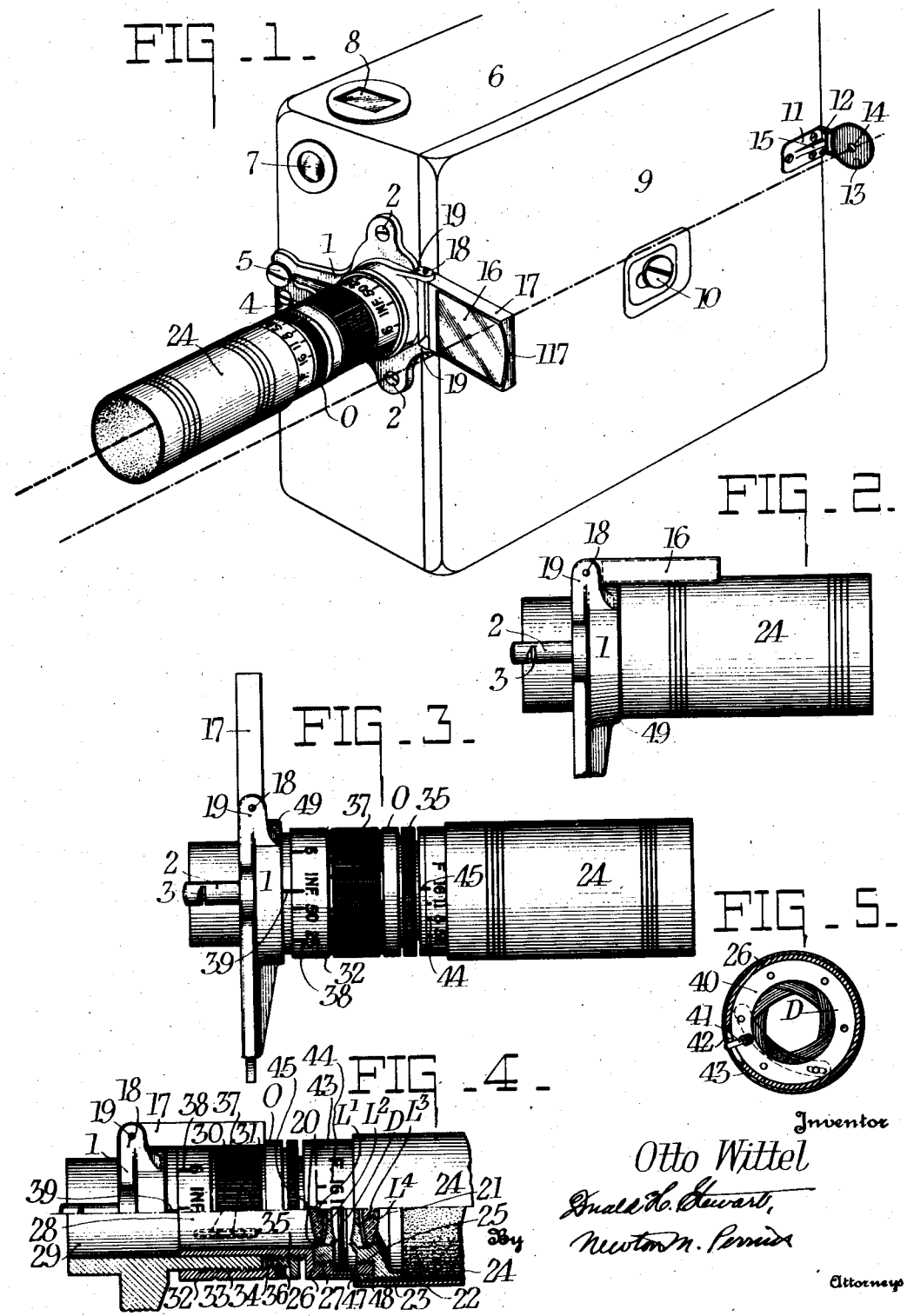

1,818,024

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

OPTICAL EQUIPMENT FOR CAMERAS

Application filed March 29, 1928. Serial No. 265,790.

This invention relates to photography and more particularly to optical equipment for cameras. One object of my invention is to provide a camera objective with a suitable lens hood. Another object of my invention is to provide a lens hood which does not increase the normal length of the objective, and which is simple and easy to operate. Another object of my invention is to provide an objective with a lens hood which must be placed in an operative position before the objective can be adjusted for use. Another object is to provide a lens hood which may also serve as a handle for adjusting a movable part of the objective. Another object of my invention is to provide an optical element which is entirely self contained, and which may be readily attached and detached from a camera. Another object is to provide a camera with a removable optical element which provides both an objective and a finder element which may be used together, without other adjustments when applied to a camera. Still another object is to provide an optical unit for cameras which folds up into a comparatively small space, and which may be readily carried and attached to a camera. And other objects will appear hereinafter from the following specification, the novel features being particularly pointed out in the claims at the end thereof.

In cameras and particularly in motion picture cameras it has been found advantageous to provide a series of objectives of different focal lengths to take care of different types of subjects. Each time a different objective is placed on a camera the usual type of scales carried by the camera are rendered useless, as also is the finder. By providing an optical unit such as will be hereinafter fully described, it is not necessary to focus the different objectives upon a ground glass, nor is it necessary to provide supplementary masks or other adjusting mechanism to the camera finder to render it accurate.

Coming now to the drawings wherein like reference characters denote like parts throughout:

Fig. 1 is a perspective view of a typical motion picture camera equipped with an optical unit constructed in accordance with and illustrating a preferred embodiment of my invention;

Fig. 2 is an elevation of the unit removed from a camera, the parts being in a folded position;

Fig. 3 is a similar view of the unit shown in Fig. 2, with the parts extended in position for use;

Fig. 4 is a part section part side elevation of the unit shown in the other figures; and Fig. 5 is a fragmentary enlarged sectional view showing the diaphragm construction.

I prefer to provide a camera attaching and detaching mechanism of the type shown in my copending application for lens mount for cameras Serial No. 251,034 filed Feb. 1, 1928, although the optical unit may be attached by any other mechanism if so desired. The attaching mechanism, as fully shown in my application above referred to, may comprise a support 1 having a pair of posts 2 which may be locked into suitable apertures in the camera by means of a latching mechanism entering the slots 3 when a lever 4 pivoted at 5 to the camera body is swung to an operative position. Since this forms no part of the present invention it will not be further described in this application.

The camera is here shown as comprising a box 6 in which there may be mounted the usual finder, consisting of an image forming lens 7 and a viewing lens 8, and which may be provided with a door 9 which is removable when the latch 10 is released in the usual manner.

On the door 9 I prefer to attach a plate 11 to which there is hinged at 12 a rear finder sight 13 which has a suitable view opening 14. A spring 15 may be provided for holding this sight in an open or a closed position.

This sight is adapted to cooperate with a front sighting member 16 carried by a frame 17 supported on pintle 18 carried by lugs 19 which may be integral with the base member 1. The finder elements composed of the rear sight 13 and the front sight 16 are of such dimensions that the field of view corresponds to the picture area which is covered by the objective designated broadly as O, which is also mounted upon the support 1. Thus for each different focal length objective the front finder sight 16 is altered so that whenever an objective is placed on the camera, the finder will always give the correct view for that objective.

When I refer to the objective in the specification and claims I intend the word to be used in its generic sense to include not only the lens elements which make up the objective, but also the mount in which the lenses are carried. As shown in Fig. 4 the objective may consist of the lenses L1, L2, L3, and L4, the first two forming the rear component 20 of the objective and the last two elements forming the front component 21. The front component 21 consists of an annular member having a flange 22 inside of which plush 23 is placed to form a light lock for the lens shade 24. Member 22 is also threaded at 25 to a tubular member 26 which is threaded at 27, the rear lens component 20 being attached to this threaded member. The tubular member 26 has a rearwardly extending portion 28 which is mounted to slide in the tubular portion 29 of the support 1. A slot 30 and key 31 permits member 26 to slide in the support but not to turn in it.

In order to move member 26 back and forth for focusing the objective, a revoluble sleeve 32 is provided, this having a threaded attachment at 33 with the support 1 and having a threaded attachment at 34 with member 26. The sleeve is made in two parts 32 and 35, these parts being relatively adjusted to provide an initial adjustment after which they are fastened together to move as one member by means of a set screw 36. Threads 33 and 34 run in opposite directions, that is, one is a right hand thread and the other is a left hand thread. By turning the knurling 37 and by bringing a graduation on the scale 38 into registration with a locating line 39 the objective may be focused.

In order to adjust the diaphragm the following mechanism is used. The diaphragm D is of the usual construction having one fixed and one movable plate upon which the diaphragm leaves may be altered. In Fig. 5 the diaphragm is shown, and the movable plate 40 is provided with a pin 41 extending through a slot 42 in the barrel 26, this pin being carried by an annular member 43 having on its exterior surface a scale 44, any graduation of which may be brought opposite to a pointer 45. On one end of the annular member 43 there is a knurling 47, this knurling being in position to be engaged by plush or other light locking material carried by the lens shade 24.

When the lens shade is drawn out into the position shown in Figs. 1, 3, and 4, the knurling 47 is engaged by the light locking material 48, and by turning the lens shade the diaphragm adjusting ring 44 will be turned.

It should be noted that the outside of the objective O while of somewhat irregular shape is substantially cylindrical, and the parts are of approximately the same diameter except for the outward extending flange 22 of the lens cell 25 and for the knurling 47. The light locking material 48 of the lens shade 24 forms a stop limiting the outward movement of the lens hood 24 when it comes into contact with the knurling 47, and the inward limit of movement of the lens hood is provided by a flange 49 extending outwardly from the base 1. When the lens hood is in contact with stop 49 it telescopes the objective O and completely covers both the diaphragm scale 44 and the focusing scale 38. Since both these scales must be adjusted when using the camera, it serves as a memory cue to the operator that the lens hood must be drawn out into an operative position before pictures can be taken.

While lens hoods are advisable for most objectives they are particularly useful when taking pictures against the light, and if Telephoto lenses—that is, lenses of long focal length with respect to the picture area—a lens hood is essential to prevent flare.

As will appear from Fig. 1, the edge 117 of frame 17 is cut away so that the front sight 16 of the finder may be folded compactly against the lens shade 24 when not in use. As the lens shade 24 is of approximately the same length as the objective O the optical unit may be compactly folded into a comparatively small space as indicated in Fig. 2.

In operation my invention works as follows: A camera operator may have one or more objectives of different focal lengths, each carried by a base 1 which is removable from and attachable to a camera as described in my copending application. As also described in this application, it is only necessary to swing lever 4 about the pivot 5 to attach or detach any desired unit. With the unit in place on the camera the front finder element 16 may be swung about its pintle 18 so that by using this finder element with the rear sight finder element 13, the correct field of view for the particular objective in use will appear in the finder. When a picture is to be taken the desired diaphragm opening and focal adjustment must be made, therefore, by glancing at the optical element if the scales for these adjustments do not appear the operator draws out the lens shade 24 until it comes to a stop in which position both scales will be exposed. The focusing may be then done by turning the knurled ring 37 and the diaphragm may be altered by turning the lens shade 24.

It will thus be seen that I have provided a compact unit which may be folded into a comparatively small space, and which is complete in itself as it contains both the focusing and diaphragm scales, and lens hood particularly necessary for the long focal length lenses, and an element of the finder which in combination with another finder element carried by the camera body will indicate the correct field of view for the objective in use.

Having thus described my invention, what I claim as new and desire to secure by Letters Patent is,—

1. In a camera, the combination with an objective having scales located thereon, of a lens hood slidably mounted thereon, said lens hood being movable to an operative position extending beyond the objective and exposing said scales, and being movable to an inoperative position surrounding said objective and obscuring said scales.

2. In a camera, the combination with an objective, having an adjusting scale thereon, of a lens hood mounted to move into an operative and an inoperative position with respect to the objective, being adapted to cover said scale when in an inoperative position and being adapted to uncover said scale when moved to an operative position.

3. In a camera, the combination with an objective, having an adjusting scale thereon, of a lens hood slidably mounted upon the objective and movable thereon to and from an inoperative position, said lens hood being adapted to telescope said objective and obscure said scale thereon when in an inoperative position.

4. In combination, an objective having relatively movable parts, a scale for indicating the relative adjustment of said parts, and a lens hood mounted to move relative to said objective to an operative and an inoperative position and adapted to obscure said scale and movable parts when in an inoperative position.

5. In an optical equipment for cameras, the combination with an objective including a plurality of parts of an adjusting member carried by the objective included in the plurality of parts, said member being movable relative to other parts, a lens hood adapted to be movable to an operative and an inoperative position with respect to the objective, said lens hood when in its inoperative position being adapted to cover said adjusting member.

6. In an optical equipment for cameras, the combination with an objective including lenses, of a diaphragm, a movable adjusting member for the diaphragm, a lens hood slidably mounted on the objective adapted to telescope the adjusting member in one position, said lens hood being also adapted when moved to another position to frictionally engage and move the diaphragm adjusting member.

7. In an optical equipment for cameras the combination with an objective, a knurled adjusting ring projecting therefrom, a slidable lens hood adapted to move into engagement with the knurled adjusting ring, whereby said lens hood may be used to turn said adjusting ring.

8. In an optical equipment for cameras the combination with an objective, a knurled adjusting ring projecting therefrom, a slidable lens hood mounted on the objective, a relatively soft lining in one end of the lens hood, means for engaging the knurling and soft lining by moving the lens hood to one extent of its movement upon the objective, whereby said lens hood may be used to turn the adjusting member and shade the lens.

Signed at Rochester, New York, this 26th day of March, 1928.

OTTO WITTEL.